United States Patent
St. John et al.

(10) Patent No.: US 11,729,371 B2
(45) Date of Patent: Aug. 15, 2023

(54) SYSTEMS AND METHODS FOR IMPROVED CAMERA COLOR CALIBRATION

(71) Applicant: FORD GLOBAL TECHNOLOGIES, LLC, Dearborn, MI (US)

(72) Inventors: Christopher N. St. John, Northville, MI (US); Koji L. Gardiner, San Francisco, CA (US); Ravi Babu Basavaraj, Sunnyvale, CA (US); Bowei Zhang, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 17/070,038

(22) Filed: Oct. 14, 2020

(65) Prior Publication Data

US 2022/0116584 A1   Apr. 14, 2022

(51) Int. Cl.
*H04N 17/00*       (2006.01)
*G06T 7/80*        (2017.01)
(Continued)

(52) U.S. Cl.
CPC ............ *H04N 17/002* (2013.01); *G06T 7/80* (2017.01); *G06T 7/90* (2017.01); *G06V 10/56* (2022.01);
(Continued)

(58) Field of Classification Search
None
See application file for complete search history.

(56) References Cited

U.S. PATENT DOCUMENTS 8,861,787 B2 * 10/2014 Kido .................. H04N 9/735
                                                382/103
9,272,709 B2    3/2016 Shalom
(Continued)

FOREIGN PATENT DOCUMENTS

WO    WO-2021164018 A1 *  8/2021  ......... G06K 9/00798

OTHER PUBLICATIONS

Zakir, U., I. Zafar, and E. A. Edirisinghe. "A Novel Approach to In-Car Road Sign Recognition." The 14th International Conference on Machine Design and Production, Cyprus. 2010. (Year: 2010).*
(Continued)

*Primary Examiner* — Emily C Terrell
*Assistant Examiner* — Nathan J Bloom
(74) *Attorney, Agent, or Firm* — Frank MacKenzie; Brooks Kushman P.C.

(57) ABSTRACT

Systems, methods, and computer-readable media are disclosed for improved camera color calibration. An example method may involve capturing a first wavelength emitted by a first type of traffic light. The example method may also involve determining, based on the first wavelength, a first color value associated with the wavelength emitted by the first type of traffic light. The example method may also involve capturing, by a first camera, a first image, video, or real-time feed of a first portion of a test target, the first portion of the test target including a first light color that is based on the first color value. The example method may also involve determining, based on the first image, video, or real-time feed of the first portion of a test target, a second color value output by the camera. The example method may also involve determining, based on a comparison between the first color value and the second color value, that a difference exists between the first color value and the second color value. The example method may also involve adjust-
(Continued)

ing, based on the detection that a difference exists between the first color value and the second color value, at least one of: a property of the camera or signal processing associated with the camera.

17 Claims, 3 Drawing Sheets

(51) Int. Cl.
    *H04N 1/60* (2006.01)
    *H04N 17/02* (2006.01)
    *G06V 20/58* (2022.01)
    *G06V 10/56* (2022.01)
    *H04N 9/64* (2023.01)
    *H04N 9/67* (2023.01)
    *G06T 7/90* (2017.01)

(52) U.S. Cl.
    CPC ......... *G06V 20/584* (2022.01); *H04N 1/6027* (2013.01); *H04N 9/646* (2013.01); *H04N 9/67* (2013.01); *H04N 17/02* (2013.01); *G06T 2207/10016* (2013.01); *G06T 2207/10024* (2013.01); *G06T 2207/30252* (2013.01)

(56) References Cited

U.S. PATENT DOCUMENTS

| | | |
|---|---|---|
| 10,139,832 B2 | 11/2018 | Sarkar et al. |
| 10,379,540 B2 | 8/2019 | Droz et al. |
| 10,380,438 B2 | 8/2019 | Fung et al. |
| 2012/0056911 A1* | 3/2012 | Safaee-Rad .......... G09G 3/2003 345/690 |
| 2018/0048801 A1 | 2/2018 | Kiser et al. |
| 2018/0088588 A1 | 3/2018 | Ion et al. |
| 2019/0087673 A1* | 3/2019 | Li ..................... G06K 9/6265 |
| 2019/0122059 A1* | 4/2019 | Zhou .................. G06V 10/56 |
| 2019/0156132 A1 | 5/2019 | Moosaei et al. |
| 2019/0204425 A1 | 7/2019 | Abari et al. |
| 2019/0204427 A1 | 7/2019 | Abari et al. |
| 2019/0215418 A1 | 7/2019 | Chen et al. |
| 2019/0318175 A1* | 10/2019 | Zhao .................. B60R 11/04 |
| 2020/0410772 A1* | 12/2020 | Silverstein .......... G06T 19/006 |

OTHER PUBLICATIONS

Vitas, Dijana, Martina Tomic, and Matko Burul. "Traffic light detection in autonomous driving systems." IEEE Consumer Electronics Magazine 9.4 (Jun. 2020): 90-96. (Year: 2020).*

Possatti, Lucas C., et al. "Traffic light recognition using deep learning and prior maps for autonomous cars." 2019 international joint conference on neural networks (IJCNN). IEEE, Jul. 2019. (Year: 2019).*

Fan, Bo, Weiyao Lin, and Xiaokang Yang. "An efficient framework for recognizing traffic lights in night traffic images." 2012 5th International Congress on Image and Signal Processing. IEEE, Oct. 2012. (Year: 2012).*

Kim et al. "An Efficient Color Space for Deep-Learning Based Traffic Light Recognition", Hindawi Journal of Advanced Transportation, Dec. 6, 2018, pp. 1-12, vol. 2018, Republic of Korea.

Extended European Search Report of European application No. 21202398.0 dated Mar. 7, 2022, 9 pages.

* cited by examiner

SYSTEMS AND METHODS FOR IMPROVED CAMERA COLOR CALIBRATION

BACKGROUND

In some instances it may be important for a camera to be able to capture an object of a particular color and output color data that closely corresponds to, or is the same as, known color data. As a non-limiting example of this, a camera that is used by a vehicle for semi-autonomous or autonomous functionality may more effectively function if it is able to output more accurate color data pertaining to known objects, such as road signs, traffic lights, road lane markers, or the like. That is, it may be important for the camera to output RGB values that are close to, or the same as, known RGB colors for a given object. To ensure that cameras operate as effectively as possible in this regard, cameras may be calibrated for certain colors. In some cases, this calibration may involve the use of a physical test target that is placed in front of a camera and includes the colors that the camera is to be calibrated against. In some cases, the test target may be in the form of a Macbeth ColorChecker or Macbeth chart. In its typical form, the Macbeth chart may be a physical chart including 24 color patches, each patch being a different color or shade of a color. The red blue green (RGB) values of the patches on the Macbeth chart may be known to a tester. That is, the RGB values of the colors that are included on the Macbeth chart may already be known before they are added. The camera may capture an image, video, or real-time feed of the Macbeth chart (or individual patches on the Macbeth chart) and the resulting RGB values produced by the camera for the one or more of the patches on the Macbeth chart may be compared to the known RGB values in order to determine if there is a difference between the true RGB values of the colors and the RGB values that the camera is producing. A difference in these two values may exist due to hardware and/or software properties of the camera. Based on this comparison, either the properties of the camera itself may be altered so that it produces the same (or a more similar) RGB values as the known RGB values, or back-end signal processing may adjust the RGB outputs of the camera based on the identified difference. For example, a color correction matrix (CCM) may be employed in back-end signal processing to account for these differences. However, given that the Macbeth chart is typically limited to the 24 different colors, the Macbeth chart may be association with certain limitations in terms of the breadth of colors that it may be used for calibration purposes.

Additionally, in the specific case of traffic light colors, the distinction between colors like red and yellow (or orange) may be challenging because the spectrums for these colors may be close (for example, may include some similar wavelengths), and traditional CCMs may not account for actual spectral colors of traffic lights. That is, there may be some overlap between two color spectrums, such as red and yellow), which may make it challenging for a CCM to distinguish between the two color spectrum. For example, a red light may sometimes be detected as a yellow light. Furthermore, some cameras may include a filter array that may also cause frequencies of light to be separated because spatially separated may have to be re-interpolated. This separation may also be difficult because of the overlap that may exist between two different color spectrums, such as a red and yellow traffic light colors.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
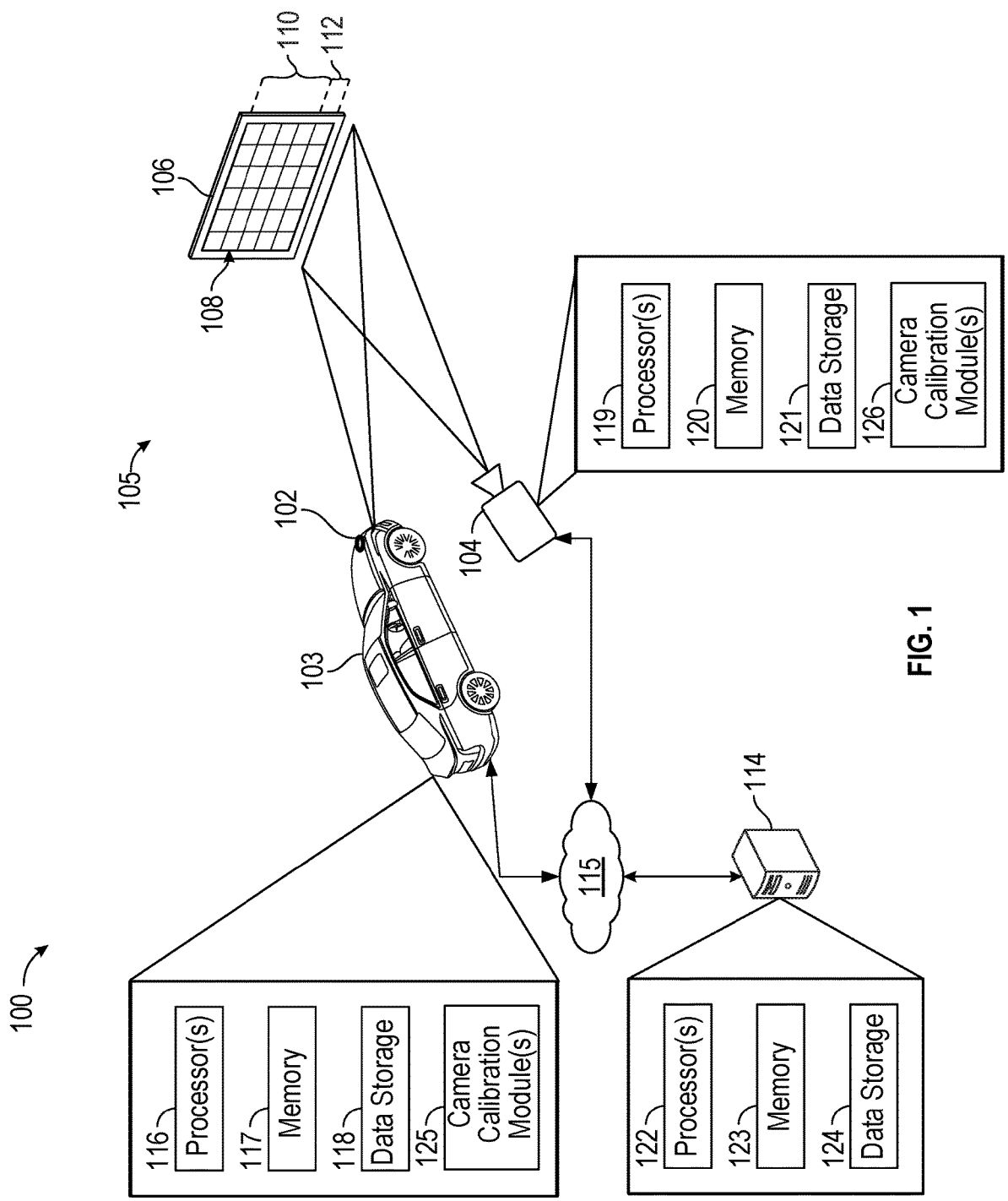
FIG. 1 depicts a schematic illustration of an example system, in accordance with one or more example embodiments of the disclosure.

This disclosure relates to, among other things, systems and methods for improved camera color calibration. In some embodiments, the systems and methods may more particularly pertain to improved color calibration for cameras. Color calibration for a camera may refer to calibrating the camera, or post-processing elements associated with the camera, to produce output color values (for example, RGB values) that more closely, or exactly, align with known or actual color values for a color of an object being captured by the camera. That is, without the calibration described herein being performed, a camera may capture an object having a color with a known RGB value, but may output an RGB value that may differ from this known RGB value. This may result from the different types of hardware and/or software that may be associated with a particular camera. For example, sensors used by a camera may not have the same spectral response as a human eye. This may be potentially problematic for systems that require accurate data in order to most effectively function, such as the semi-autonomous or autonomous vehicle functionality mentioned below. As mentioned above CCMs may be employed in post-processing of data outputs from a camera in order to correct for some of the aforementioned discrepancy between the color data output from the camera and the known color data associated with a particular color. However, the distinction between similar colors like red and yellow (or orange) may be challenging because the spectrums for these colors may be close, and traditional CCMs may not account for actual spectral colors of traffic lights. That is, there may be some overlap between two color spectrums, such as red and yellow), which may make it challenging for a CCM to distinguish between the two color spectrum. For example, a red light may sometimes be detected as a yellow light. Furthermore, some cameras may include a filter array that may also cause frequencies of light to be separated because spatially separated may have to be re-interpolated. This separation may also be difficult because of the overlap that may exist between two different color spectrums, such as a red and yellow traffic light colors. Additionally, in some cases physical targets, such as Macbeth charts, may be used to calibrate a camera for a particular color, but these test targets may be limited in the selection of included colors, and may not include colors that may be important for particular camera applications (such as colors of objects that a camera may encounter when assisting a vehicle with semi-autonomous or autonomous vehicle functionality). It should be noted that while reference may be made to determining traffic light colors herein, the same systems and methods may be used to perform calibrations for any other type of objects of any other colors. For example, the systems and methods may be used to perform calibrations for lane markers on a road.

In some embodiments, the improved color calibration may involve the camera being calibrated for a wider variety of different types of colors using a physical test target, such as a Macbeth chart. A Macbeth chart may be a physical target that includes 24 different colored squares ("patches") arranged in a grid-like configuration. The Macbeth chart may be placed in front of a camera and used for purposes of calibrating the camera for the colors included within the patches on the chart. However, the Macbeth chart may be limited in the number of colors it may include for calibration with the camera. Thus, the test target described herein may be in the form of a Macbeth chart that may be supplemented with additional color patches beyond the 24 color patches that may be typically included in a Macbeth chart. The additional colors added to the Macbeth chart may correspond to additional colors that are desired to be calibrated for a particular camera in a particular context, and the colors that are added to the supplemented Macbeth chart may vary depending on the particular context in which the camera is to be used. As an example implementation of this improved color calibration, semi-autonomous or autonomous vehicles may include one or more cameras that may be used to assist in the semi-autonomous or autonomous functionality of the vehicle. For example, the cameras may be used to identify a color of a traffic light so that the vehicle may be able to determine an appropriate action to take when approaching a traffic light (for example, continue driving, slow down, and/or stop, among other actions). It may be important for the vehicles to be able to accurately identify the correct color of the traffic light because the action taken by the vehicle may depend on the color that is identified. In this particular example in which it is desired to calibrate a vehicle's camera for the colors of the traffic lights, the known traffic light colors may be added to the Macbeth chart, and the Macbeth chart may be used to ensure that the camera is then calibrated for those particular colors so that the camera may accurately detect those colors during real-time operation. It should be noted that while calibration of cameras for different traffic light colors may be described herein for consistency, the systems and methods described herein may similarly be used for the calibration of a camera for any other type of object of any varying types of colors. Additionally, it should also be noted that although reference is made herein to the use of a Macbeth chart, the systems and methods described herein may similarly be applied to any other type of physical (or digital) color calibration target as well. For example, the colors may be presented in any other shape, different colors may be provided on individual targets, groups of colors may be provided on separate targets, and/or the target may not be a physical target, but may rather be a digital representation of the color that may be used as a target in a similar manner that a physical target may be used.

In some embodiments, the specific color patches to be added to the supplemented Macbeth chart may be based on pre-determined RGB values for the individual colors that are desired to be calibrated for the camera. Continuing the above example, RGB values for different shades of red, yellow, and green colors emitting from different types of traffic lights (for example, incandescent traffic lights or LED traffic lights, among other types of traffic lights) may already be known, and these RGB values may be used to generate a color patch to be added to the Macbeth chart for each of the colors desired to be calibrated. For example, red light from an incandescent traffic light may differ from red light emitted from a light emitting diode (LED) traffic light. Thus, both of these shades of red may be included in the supplemented Macbeth chart so that the camera may be able to accurately detect a red traffic light regardless of the type of traffic light. However, in some cases, the RGB values may also be determined by capturing data in real-time from different types of traffic lights emitting the different colors. In some cases, a spectrometer may be used to capture the light emitted from a traffic light of a particular type in order to determine the RGB values associated with that light emitted from the traffic light. For example, the spectrometer may be placed in front of an incandescent traffic light and may capture light emitted from the incandescent traffic light when the traffic light is emitting a red light, a yellow light, and/or a green light. The spectrometer may be able to determine one or more wavelengths (for, example which may be in the form of a color spectrum) of the particular light. This wavelength (or color spectrum for the particular color) may then be used to determine an RGB value associated with the particular color using a look-up table including wavelengths (or other spectral information) and associated RGB values, for example. The RGB value may then be used to create a color patch to add to the Macbeth chart for purposes of calibrating a camera against the color of the traffic light. The spectrometer may similarly be used to determine RGB values for other types of traffic lights in a similar manner as well. In these cases, the RGB values captured by the spectrometer may be used to generate the color patches to add to the Macbeth chart, instead of using pre-determined values. Additionally, the determined RGB values associated with individual patches to be added to the Macbeth chart may be stored for calibration purposes as may be described below. These RGB values may be stored locally to the camera or in a remote location (such as in a computing element used to perform the calibration or a server on a network, to name a few examples). This method may also be used when pre-determined RGB values for a specific type of object's color may not be known.

In some embodiments, the calibration systems and methods described herein may also be applied during real-time operation of the camera rather than in a testing environment. That is, instead of (or in addition to) pre-calibrating a camera before the camera is used to capture images, videos, and/or real-time feeds in real-time operation, the camera may also be calibrated for colors of objects that the camera is capturing in real-time. For example, if the camera is implemented in or on a vehicle with semi-autonomous or autonomous functionality, as the vehicle is traversing an environment, the camera may be capturing images, videos, and/or real-time feeds of objects included within the environment. While some of the types of objects being captured by the camera may not be associated with standardized colors, some of the objects may in fact be associated with these standardized colors (for example, road signs, road lane markers, and other types of standardized objects found nearby a road may include standardized colors). A computing system associated with the vehicle may be able to classify the objects being captured by the camera based on other information, such as the shape or size of the object, or by using other, more complex, computer vision techniques, to name a few examples. Once the object is classified, a known RGB value associated with the object may be obtained. For example, the vehicle may maintain a database of types of objects and their associated RGB values. This database may also be maintained remotely from the vehicle (for example, in a remote computing device 214 described with respect to FIG. 2). Once this known RGB value is obtained, the output RGB value produced by the camera may be compared to this known RGB value in a manner similar to which the RGB values would be compared if a test target were to be used as described above. The same adjustments to the camera or the signal processing associated with the camera may then be performed in real-time while the camera is traversing the environment. For example, the adjustments may be in the form of an updated CCM that may be used in signal processing to account for the differences in the determined RGB values produced by the camera and the known RGB values.

In some embodiments, the adjustments may involve adjusting an RGB value associated with a particular color by first converting the RGB value into a HSV (hue, saturation, lightness) color representation, which may be an alternative representation of color to RGB values. This conversion from RGB to HSV before making any adjustments to the color may be performed because it may be difficult to adjust from one color to another similar color using RGB values because changes in the RGB values may be non-linear in some cases. For example, it may be difficult to transition from a blue color to a lighter blue color by adjusting just the RGB values. To mitigate this potential difficultly, an RGB value may be converted into HSV, and the color may then be adjusted in the HSV representation by changing a hue value of the color (or similarly its saturation and/or lightness value as well in some cases). The color may then be converted back into an RGB value. Using HSV to perform the color adjustments instead of performing the adjustments using RGB values may allow for distance between the color spectrums of different types of colors (such as red and yellow, for example) to be more easily performed and may result in a more optimized CCM for each color.

In some embodiments, the real-time calibration and testing environment calibration may also work in conjunction. For example, a first vehicle with a first camera may be traversing an environment in real-time capturing data about objects included within the environment. Based on the data that is captured about the objects, the first vehicle may provide an indication to a testing environment (a testing environment, for example, may be any location in which a test target may be located that a camera may use for color calibration) that a particular color should be added to a color testing target to calibrate a second camera located in the testing environment. This may be based on the first vehicle identifying new types of objects or known objects with new color configurations, or any other type of data that may lend itself to performing calibration of other cameras for a particular color. Additionally, individual cameras may not all necessarily need to be calibrated using the test target described herein. For example, a first camera may be calibrated in a testing environment, and then information about the adjustments made to the first camera based on the calibration may be sent to other cameras so that the other cameras can make the same adjustments without having to go through the full calibration process. As one example, a camera in a testing environment may be calibrated in a testing environment, and then the adjustments made based on that calibration may be communicated to cameras operating in real-time (for example, on vehicles traversing an environment). The opposite may also be true for example, adjustments made based on calibration performed in real-time may be communicated to cameras located in a testing facility, or similarly, adjustments may be communicated between one or more cameras operating in real-time as well. Such communication may be performed over any suitable type of wired or wireless network connection. For example, using wireless protocols such as 4G, 5G, Long Term Evolution (LTE), LTE-Advanced, 5G, IEEE 802.11, IEEE 802.16, Bluetooth, ZigBee, near-field communication (NFC), and the like. In the specific example of cameras implemented on vehicles, the vehicles may communicate the information to one another using communication protocols such as vehicle-to-vehicle (V2V), or any other similar type of communication protocol. The vehicles may also communicate using any other type of wired or wireless communication method as well.

Illustrative System Architecture

FIG. 1 depicts a schematic illustration of an example system 100, in accordance with one or more example embodiments of the disclosure. In some embodiments, the system 100 may include one or more cameras, which may be integrated into another element of the system 100, or may be standalone cameras. For example, the system 100 may depict a first camera 102 that is integrated into a vehicle 103 and a second camera 104 that is a standalone camera. The system 100 may also include a color test target 106 and/or a remote computing device 114. While the first camera 102 is being depicted as being integrated into a vehicle 103, it may similarly be part of or associated with any other element in the environment of system 100, such as a person, or a residential or commercial home, to name a couple non-limiting examples.

In some embodiments, the one or more cameras may include any camera that is to be calibrated using the systems and methods described herein. That is, the one or more cameras may be calibrated for detection of certain types of colors. The cameras may include any type of camera, such as a complementary metal oxide semiconductor (CMOS) camera, an infrared-capable camera, a charge-coupled device (CCD) camera, or any other type of camera. As described above, the calibration of such cameras may be performed using the camera in a standalone manner (for example, shown as the second camera 104) and/or with the camera integrated into another element, such as a vehicle (for example, shown as the first camera 102 that is integral the vehicle 103). The one or more cameras may be placed within a test environment 105 (however, the cameras may not necessarily need to be calibrated in a test environment, and may similarly be calibrated in any other location as well) and may be used to capture one or more images, videos, and/or real-time live feeds of the color test target 106 that may also be included within the test environment 105. More specifically, the one or more cameras may be used to capture one or more images, videos, and/or real-time live feeds of at least one or more individual color patches included within the color test target 106. As described in more detail herein, the RGB values output by the one or more cameras based on the one or more captured images, videos, and/or real-time live feeds captured of the color test target 106 may be compared to known RGB values. Based on the comparison, the camera may be calibrated to reduce or eliminate the difference between the output of the camera and the known color values. The one or more cameras may also include at least one or more processor(s) (for example, shown as processor(s) 116 for the first camera 102 and processor(s) 119 for the second camera 104), memory (for example, shown as memory 117 for the first camera 102 and memory 120 for the second camera 104), data storage 118 (for example, shown as data storage 118 for the first camera 102 and data storage 121 for the second camera 104), and/or one or more camera color calibration modules (for example, shown as camera color calibration module(s) 125 for the first camera 102 and camera color calibration module(s) 126 for the second camera 104). The data storage may be used to store any data used for the purposes of the color calibration described herein, such as known RGB values associated with particular types of colors, spectral information captured for a traffic light, images, videos, and CCM information, among other types of information. In some instances, any of the information stored in the data storage may also be stored in memory as well. The one or more camera color calibration module(s) 125 may be configured to perform any of the operations described herein, such as any operations associated with camera color calibration (for example, operations described with respect to FIG. 3). It should be noted that while certain the processor(s) 116, memory 117, data storage 118, and camera calibration module(s) 125 are described as being associated with the first camera itself 102, in some cases, the processor(s) 116, memory 117, data storage 118, and camera calibration module(s) 125 may similarly be incorporated into the element in which the first camera is integrated 102 as well. For example, the processor(s) 116, memory 117, data storage 118, and camera calibration module(s) 125 may be associated with the vehicle 103 instead of the first camera 102 itself. That is, the vehicle 103 may include the processor(s) 116, memory 117, data storage 118, and camera calibration module(s) 125 and the first camera 102 may simply serve to capture input data regarding the color test target 106. The one or more cameras may also include any other elements, such as described with respect to the computing device 300 of FIG. 3. Additionally, any of the processor(s), memory, data storage, and or camera color calibration modules may be described in more detail with respect to FIG. 3 as well.

In some embodiments, the color test target 106 may be a target including one or more colors, and may be used to calibrate a camera (for example, the one or more cameras) for any of the colors included on the color test target 106. In some cases, the color test target 106 may be a physical target, such as a cardboard target that may be placed in a real environment (cardboard is merely an example of a type of material that may be used for the target, and any other suitable material may also be used). The physical target may include one or more colored patches. For example, the one or more colored patches may be square in shape and arranged in a grid formation, such as may be found in a Macbeth chart. However, instead of only including the 24 colors typically found in a Macbeth chart, the color test target 106 may include any number of additional supplemental colors as well. As described herein, the supplemental colors may correspond to colors of objects that the camera may need to identify during real-time operation. For example, if the camera is to be used on a vehicle to assist the vehicle in performing semi-autonomous or autonomous functionality, then a supplemental color may include a color corresponding to a traffic light signal (for example, a particular shade red, yellow, or green). The color test target 106 may be used to calibrate the camera of the vehicle so that it may accurately identify the traffic light signal color. This may be important because an action that the vehicle may autonomously take when approaching a traffic light may depend on the vehicle's ability to detect the color currently being emitted by the traffic light. In some cases, the patches included in the color test target 106 may also be arranged in any other shapes and/or sizes. That is, the color patches may not necessarily be presented on the color test target 106 in a manner in which they would appear in a Macbeth chart. Additionally, multiple color test targets 106 may be employed that may include one or more subsets of a total group of colors that a camera is to be calibrated against. Furthermore, in some cases, the color test target 106 may not necessarily be presented in a physical form, and instead may be digitally presented. For example, instead of physically printing out a color test target 106 including the color patches, the color patches may be displayed on a light emitting diode (LED) screen, or any other type of screen, may be projected onto a surface using a projector, or may be digitally presented in any other suitable manner.

In some embodiments, the remote computing device 114 may include any device that is located remotely from the other elements of the system 100, and may be used alternatively to, or in conjunction with, any of the other elements included within the system 100. For example, the remote computing device 114 may be a remote server, and may be used to perform any of the processing associated with the calibration of the one or more cameras using the color test target 106. The remote computing device 114 may also be used to remotely store any data associated with the calibration process. For example, the remote computing device 114 may store known RGB values for various colors associated with particular types of objects. The remote computing device 114 may also include any of the elements depicted as being associated with the one or more cameras, such as one or more processor(s) 122, memory 123, data storage 224, and/or camera color calibration module(s) 124. That is, any operations described herein with respect to color calibration of the one or more cameras may be performed locally at the one or more cameras, or be performed alternatively at, or in conjunction with, the remote computing device 114. The remote computing device 114 may also include any other elements, such as described with respect to the computing device 300 of FIG. 3. Additionally, any of the processor(s), memory, data storage, and or camera color calibration modules may be described in more detail with respect to FIG. 3 as well.

In some embodiments, the one or more cameras, the color testing target 106, and/or the remote computing device 114, and any other elements of the system 100 as described herein may be configured to communicate via a communications network 115. The communications network 115 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 115 may have any suitable communication range associated therewith and may include, for example, global networks (e.g., the Internet), metropolitan area networks (MANs), wide area networks (WANs), local area networks (LANs), or personal area networks (PANs). In addition, communications network 115 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Illustrative Processes

Figure 2:
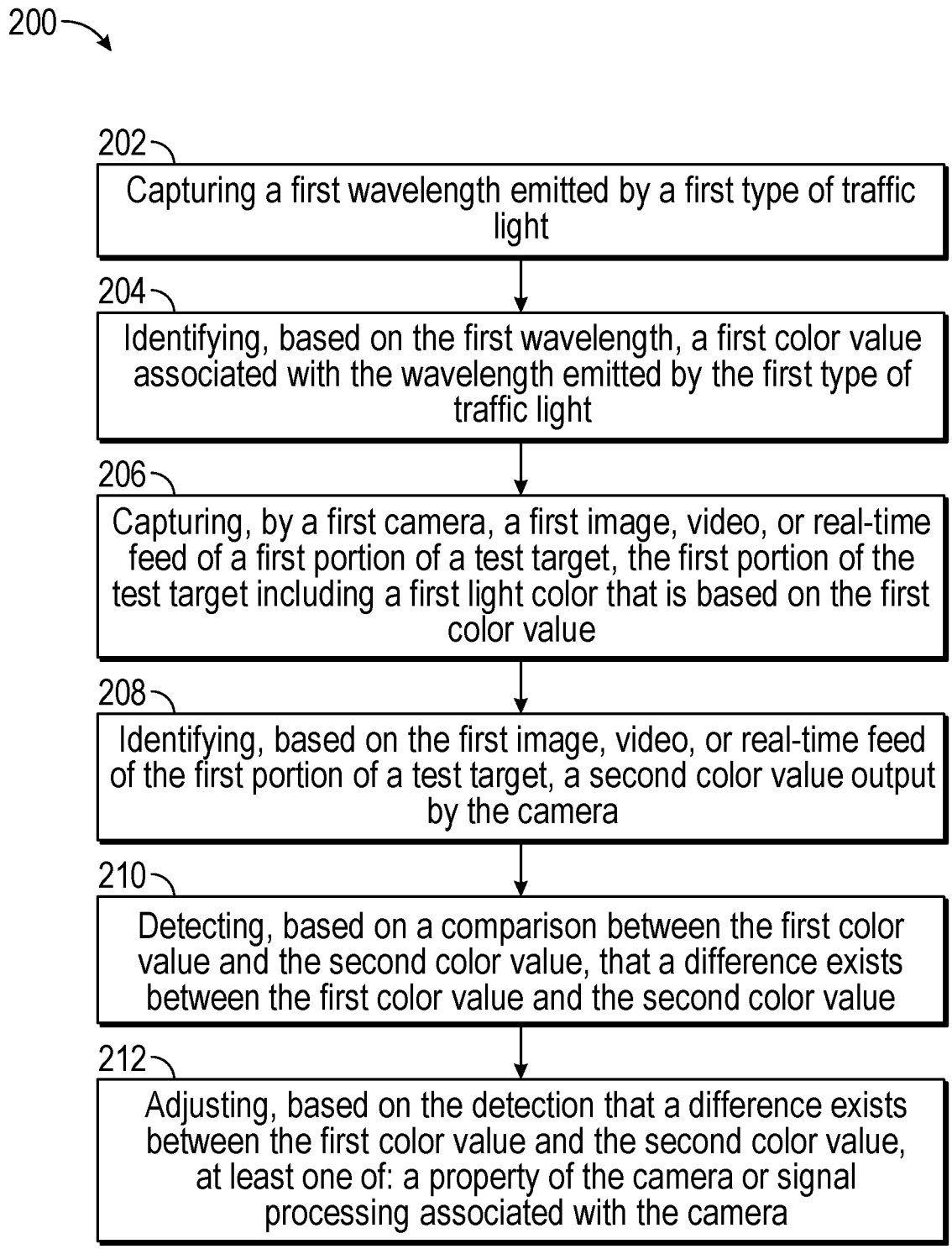
FIG. 2 depicts a schematic illustration of an example method, in accordance with one or more example embodiments of the disclosure.

FIG. 2 is an example method 200 in accordance with one or more example embodiments of the disclosure. At block 202 of the method 200 in FIG. 2, the method may include capturing a first wavelength emitted by a first type of traffic light. Block 204 of the method 200 may include identifying, based on the first wavelength, a first color value associated with the wavelength emitted by the first type of traffic light. In some cases, the wavelength may more particularly refer to one or more wavelengths forming a color spectrum for a particular color. The one or more wavelengths may be pre-determined in some instances. That is, certain colors may be standardized, such as colors used for different types of traffic lights in different areas. In some cases, the one or more wavelengths (for example, color spectrum) associated with a particular objects of a particular color may also be captured in real-time without relying on a pre-determined color value (or if the object is not associated with any pre-determined color values). To capture the color spectrum of the object, a spectrometer may be used to capture the light emitted from the object of a particular type in order to determine the RGB values associated with that light emitted from the object. For example, the spectrometer may be placed in front of an incandescent traffic light and may capture light emitted from the incandescent traffic light when the traffic light is emitting a red light, a yellow light, and/or a green light. The spectrometer may be able to determine one or more wavelengths (for, example which may be in the form of a color spectrum) of the particular light. This wavelength (or color spectrum for the particular color) may then be used to determine an RGB value associated with the particular color using a look-up table including wavelengths (or other spectral information) and associated RGB values, for example. The RGB value may then be used to create a color patch to add to the Macbeth chart for purposes of calibrating a camera against the color of the traffic light. The spectrometer may similarly be used to determine RGB values for other types of traffic lights (as well as other objects, such as lane markers, etc.) in a similar manner as well.

Block 206 of the method 200 may include capturing, by a first camera, a first image, video, or real-time feed of a first portion of a test target, the first portion of the test target including a first light color that is based on the first color value. That is, the color spectrum that is obtained for a particular object of a particular color may be used to create a color patch that is added to a test target for purposes of calibrating a camera (for example, a camera used on a semi-autonomous or autonomous vehicle). The color patch may be created based on the pre-determined color value or the determined color value (for example, using spectrometer) as described above. For example, the color patch may be created based on a known or determined RGB value associated with a particular color of a particular object.

Block 208 of the method 200 may include identifying, based on the first image, video, or real-time feed of the first portion of a test target, a second color value output by the camera. Block 210 of the method 200 may include detecting, based on a comparison between the first color value and the second color value, that a difference exists between the first color value and the second color value. In some instances, the second color value may refer to the color output of the camera capturing the color patch in the test target. Due to the hardware and/or software particular to the camera, the color output by the camera may not necessarily be the same color value as the actual color value of the test target. For example, the RGB value of the color patch and the corresponding RGB value output by the camera may be different. In such cases, calibration of the camera may be required to ensure that the camera is outputting the correct color value for the particular color. This may be important in scenarios involving semi-autonomous or autonomous vehicle functionality, for example, because the vehicles may require accurate color information to classify certain objects.

Block 212 of the method 200 may include adjusting, based on the detection that a difference exists between the first color value and the second color value, at least one of: a property of the camera or signal processing associated with the camera. For example, the adjustments may be in the form of an updated CCM that may be used in signal processing to account for the differences in the determined RGB values produced by the camera and the known RGB values. The CCM may be applied to a color output of a camera to alter the color output to the correct color value if the output of the camera is different than the known value for that color (for example, RGB value). In some embodiments, the adjustments may involve adjusting an RGB value associated with a particular color by first converting the RGB value into a HSV (hue, saturation, lightness) color representation, which may be an alternative representation of color to RGB values. This conversion from RGB to HSV before making any adjustments to the color may be performed because it may be difficult to adjust from one color to another similar color using RGB values because changes in the RGB values may be non-linear in some cases. For example, it may be difficult to transition from a blue color to a lighter blue color by adjusting just the RGB values. To mitigate this potential difficultly, an RGB value may be converted into HSV, and the color may then be adjusted in the HSV representation by changing a hue value of the color (or similarly its saturation and/or lightness value as well in some cases). The color may then be converted back into an RGB value. Using HSV to perform the color adjustments instead of performing the adjustments using RGB values may allow for distance between the color spectrums of different types of colors (such as red and yellow, for example) to be more easily performed and may result in a more optimized CCM for each color.

The operations described and depicted in the illustrative process flow of FIG. 2 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computing Element

Figure 3:
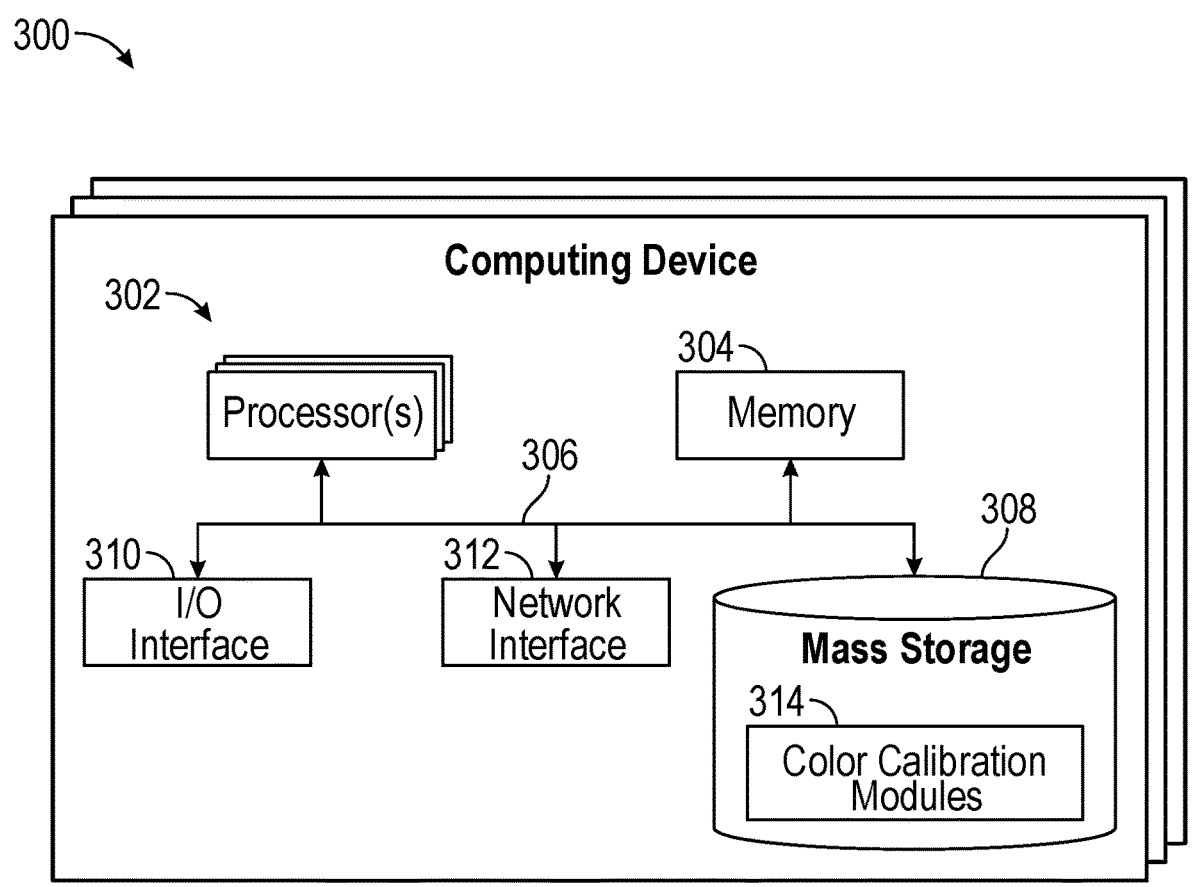
FIG. 3 depicts a schematic illustration of an example computing device architecture, in accordance with one or more example embodiments of the disclosure.

FIG. 3 illustrates an example computing device 300, in accordance with one or more embodiments of this disclosure. The computing device 300 may be a device used to perform any of the operations described herein. For example, the computing device 300 may be representative of the controller described with respect to FIG. 1, or any other controller described herein. The computing device 300 may include at least one processor 302 that executes instructions that are stored in one or more memory devices (referred to as memory 304). The instructions can be, for instance, instructions for implementing functionality described as being carried out by one or more modules and systems disclosed above or instructions for implementing one or more of the methods disclosed above. The processor(s) 302 can be embodied in, for example, a CPU, multiple CPUs, a GPU, multiple GPUs, a TPU, multiple TPUs, a multi-core processor, a combination thereof, and the like. In some embodiments, the processor(s) 302 can be arranged in a single processing device. In other embodiments, the processor(s) 302 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 302 can access the memory 304 by means of a communication architecture 306 (e.g., a system bus). The communication architecture 306 may be suitable for the particular arrangement (localized or distributed) and type of the processor(s) 302. In some embodiments, the communication architecture 306 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile discs (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 304 also can retain data, such as any ledger information, among other data.

Each computing device 300 also can include mass storage 308 that is accessible by the processor(s) 302 by means of the communication architecture 306. The mass storage 308 can include machine-accessible instructions (e.g., computer-readable instructions and/or computer-executable instructions). In some embodiments, the machine-accessible instructions may be encoded in the mass storage 308 and can be arranged in components that can be built (e.g., linked and compiled) and retained in computer-executable form in the mass storage 308 or in one or more other machine-accessible non-transitory storage media included in the computing device 300. Such components can embody, or can constitute, one or many of the various modules disclosed herein. Such modules are illustrated as camera color calibration module(s) 314 (which may be the same as translation modules 125 and 126).

Execution of the camera color calibration module(s) 314, individually or in combination, by at least one of the processor(s) 302, can cause the computing device 300 to perform any of the operations described herein (for example, the operations described with respect to FIG. 2, as well as any other operations).

Each computing device 300 also can include one or more input/output interface devices 310 (referred to as I/O interface 310) that can permit or otherwise facilitate external devices to communicate with the computing device 300. For instance, the I/O interface 310 may be used to receive and send data and/or instructions from and to an external computing device. The computing device 300 also includes one or more network interface devices 312 (referred to as network interface(s) 312) that can permit or otherwise facilitate functionally coupling the computing device 300 with one or more external devices. Functionally coupling the computing device 300 to an external device can include establishing a wireline connection or a wireless connection between the computing device 300 and the external device. The network interface devices 312 can include one or many antennas and a communication processing device that can permit wireless communication between a vehicle and either another vehicle or an external device. The other vehicle can be, for example, one of the vehicles included in the network 110 or an out-of-network vehicle. The external device can be, for example, one of the mobile devices included in the network 110. Such a communication processing device can process data according to defined protocols of one or several radio technologies. The radio technologies can include, for example, 4G, 5G, Long Term Evolution (LTE), LTE-Advanced, 5G, IEEE 802.11, IEEE 802.16, Bluetooth, ZigBee, near-field communication (NFC), and the like.

In some embodiments, the computing device 300 may be in communication with an imaging device (for example, through the I/O interface 310 of the computing device as shown in FIG. 3). The imaging device may be the same as any of the imaging devices described herein (for example, an imaging device for which a flare artifact score is determined based on one or more images that the imaging device captures).

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permu- That which is claimed is:

1. A method comprising:
    capturing a first wavelength emitted by a first type of traffic light and a second wavelength emitted by a second type of traffic light;
    identifying, based on the first wavelength, a first color value associated with the wavelength emitted by the first type of traffic light;
    identifying, based on the second wavelength, a third color value associated with the wavelength emitted by the second type of traffic light;
    capturing, by a first camera, a first image, video, or real-time feed of a first portion of a test target, the first portion of the test target including a first light color that is based on the first color value and a third light color that is based on the third color value;
    identifying, based on the first image, video, or real-time feed of the first portion of a test target, a second color value and a fourth color value output by the camera;
    detecting, based on a comparison between the first color value and the second color value, that a difference exists between the first color value and the second color value; and
    adjusting, based on the difference between the first color value and the second color value and a difference between the third color value and the fourth color value, at least one of: a property of the camera or signal processing associated with the camera.

2. The method of claim 1, wherein the adjustment includes creating a second color correction matrix (CCM) based on a first CCM associated with the camera.

3. The method of claim 1, wherein the first color value and the second color value are RGB values.

4. The method of claim 2, further comprising:
    capturing, by the first camera during real-time operation on a vehicle, a second image, video, or real-time feed of a traffic light that is of the first type of traffic light;
    receiving a first output from the first camera based on the captured second image, video, or real-time feed that includes the second color value; and
    applying the second CCM to the second color value to produce a second output including the first color value.

5. The method of claim 4, further comprising determining that the traffic light is of the first type of traffic light, and wherein applying the second CCM to the second color value is based on the identification that the traffic light is of the first type of traffic light.

6. The method of claim 1, further comprising:
    capturing, by the first camera during real-time operation on a vehicle, a third image, video, or real-time feed of a traffic light that is of the second type of traffic light;
    receiving a third output from the first camera based on the captured third image, video, or real-time feed that includes the third color value; and
    applying a third CCM to the third color value to produce a fourth output including the third color value.

7. The method of claim 6, further comprising determining that the traffic light is of the second type of traffic light, and wherein applying the third CCM to the fourth color value is based on the identification that the traffic light is of the second type of traffic light.

8. A system comprising:
    a processor; and
    a memory storing computer-executable instructions, that when executed by the processor, cause the processor to:
        capture, by a spectrometer, a first wavelength emitted by a first type of traffic light and a second wavelength emitted by a second type of traffic light;
        identify, based on the first wavelength, a first color value associated with the wavelength emitted by the first type of traffic light;
        identify, based on the second wavelength, a third color value associated with the wavelength emitted by the second type of traffic light;
        capture, by a first camera, a first image, video, or real-time feed of a first portion of a test target, the first portion of the test target including a first light color that is based on the first color value and a third light color that is based on the third color value;
        identify, based on the first image, video, or real-time feed of the first portion of a test target, a second color value and a fourth color value output by the camera;
        detect, based on a comparison between the first color value and the second color value, that a difference exists between the first color value and the second color value; and
        adjust, based on the difference between the first color value and the second color value and a difference between the third color value and the fourth color value, at least one of: a property of the camera or signal processing associated with the camera.

9. The system of claim 8, wherein the adjustment includes creating a second color correction matrix (CCM) based on a first CCM associated with the camera, and wherein the first color value and the second color value are RGB values.

10. The system of claim 9, wherein the computer-executable instructions further cause the processor to:
    capture, by the first camera during real-time operation on a vehicle, a second image, video, or real-time feed of a traffic light that is of the first type of traffic light;
    receive a first output from the first camera based on the captured second image, video, or real-time feed that includes the second color value;
    apply the second CCM to the second color value to produce a second output including the first color value; and
    determine that the traffic light is of the first type of traffic light, wherein applying the second CCM to the second color value is based on the identification that the traffic light is of the first type of traffic light.

11. The system of claim 8, wherein the computer-executable instructions further cause the processor to:
    capture, by the first camera during real-time operation on a vehicle, a third image, video, or real-time feed of a traffic light that is of the second type of traffic light;
    receive a third output from the first camera based on the captured third image, video, or real-time feed that includes the third color value;
    apply a third CCM to the third color value to produce a fourth output including the third color value; and determine that the traffic light is of the second type of traffic light, wherein applying the third CCM to the fourth color value is based on the identification that the traffic light is of the second type of traffic light.

12. A non-transitory computer readable medium including computer-executable instructions stored thereon, which when executed by one or more processors of a wireless access point, cause the one or more processors to perform operations of:
 capturing, by a spectrometer, a first wavelength emitted by a first type of object and a second wavelength emitted by a second type of object;
 identifying, based on the first wavelength, a first color value associated with the wavelength emitted by the first type of object;
 identifying, based on the second wavelength, a third color value associated with the wavelength emitted by the second type of traffic light;
 capturing, by a first camera, a first image, video, or real-time feed of a first portion of a test target, the first portion of the test target including a first light color that is based on the first color value and a third light color that is based on the third color value;
 identifying, based on the first image, video, or real-time feed of the first portion of a test target, a second color value and a fourth color value output by the camera;
 detecting, based on a comparison between the first color value and the second color value, that a difference exists between the first color value and the second color value; and
 adjusting, based on the difference between the first color value and the second color value and a difference between the third color value and the fourth color value, at least one of: a property of the camera or signal processing associated with the camera.

13. The non-transitory computer readable medium of claim 12, wherein the adjustment includes creating a second color correction matrix (CCM) based on a first CCM associated with the camera.

14. The non-transitory computer readable medium of claim 12, wherein the first color value and the second color value are RGB values.

15. The non-transitory computer readable medium of claim 13, wherein the computer-executable instructions further cause the one or more processors to perform operations of:
 capturing, by the first camera during real-time operation on a vehicle, a second image, video, or real-time feed of an object that is of the first type of object;
 receiving a first output from the first camera based on the captured second image, video, or real-time feed that includes the second color value; and
 applying the second CCM to the second color value to produce a second output including the first color value.

16. The non-transitory computer readable medium of claim 12, wherein the object is a road lane marker.

17. The method of claim 1, wherein the test target comprises at least one of a Macbeth chart, a displayed image on a screen, and a projected image on a surface.

* * * * *